(12) United States Patent
Fan (10) Patent No.: US 11,382,174 B2
(45) Date of Patent: Jul. 5, 2022

(54) METHOD TO AWAKEN A NETWORK ACCESS DEVICE FROM THE INTERNET

(71) Applicant: INTERDIGITAL CE PATENT HOLDINGS, Paris (FR)

(72) Inventor: Wei Fan, Beijing (CN)

(73) Assignee: InterDigital CE Patent Holdings, SAS, Paris (FR)

(*) Notice: Subject to any disclaimer, the term of this patent is extended or adjusted under 35 U.S.C. 154(b) by 33 days.

(21) Appl. No.: 16/499,848

(22) PCT Filed: Mar. 31, 2017

(86) PCT No.: PCT/CN2017/078961
§ 371 (c)(1),
(2) Date: Sep. 30, 2019

(87) PCT Pub. No.: WO2018/176369
PCT Pub. Date: Oct. 4, 2018

(65) Prior Publication Data
US 2020/0113018 A1    Apr. 9, 2020

(51) Int. Cl.
*H04W 88/16* (2009.01)
*H04L 12/28* (2006.01)
*H04L 67/1001* (2022.01)
*H04L 67/01* (2022.01)

(52) U.S. Cl.
CPC ......... *H04W 88/16* (2013.01); *H04L 12/2898* (2013.01); *H04L 67/1002* (2013.01); *H04L 67/42* (2013.01)

(58) Field of Classification Search
None
See application file for complete search history.

(56) References Cited

U.S. PATENT DOCUMENTS

| 6,381,650 | B1  | 4/2002  | Peacock |
| 7,324,518 | B2  | 1/2008  | Dai et al. |
| 9,665,149 | B2* | 5/2017  | Kuo .......... H04L 12/12 |
| 9,746,907 | B2* | 8/2017  | Zhang .......... G06F 1/3287 |
| 10,756,918 | B2* | 8/2020 | Winters .......... H04L 12/12 |
| 2005/0223248 | A1* | 10/2005 | Lim .......... G06F 1/3287 |
| | | | 713/300 |

(Continued)

FOREIGN PATENT DOCUMENTS

| CN | 101953117 A | 1/2011 |
| CN | 102378324 A | 3/2012 |

(Continued)

*Primary Examiner* — Lonnie V Sweet
(74) *Attorney, Agent, or Firm* — Volpe Koenig (57) ABSTRACT

A method and apparatus are described including transmitting localization information to a localization server, transitioning into sleep mode, receiving a wake up frame from an access router, transitioning to awake mode, transmitting updated localization information to the localization server and establishing a connection between a network access device and a client device. Also described are a method and apparatus including transmitting a request to connect to a network access device, receiving localization information of the network access device from a localization server and establishing a connection between the network access device and the client device based on the localization information.

4 Claims, 6 Drawing Sheets

(56) References Cited

U.S. PATENT DOCUMENTS

| | | | |
|---|---|---|---|
| 2009/0210519 A1* | 8/2009 | Zill | H04L 12/2825 709/220 |
| 2010/0262681 A1* | 10/2010 | Chang | H04N 21/25816 709/221 |
| 2011/0119512 A1 | 5/2011 | Siegmund | |
| 2011/0302278 A1* | 12/2011 | Shim | H04L 12/12 709/219 |
| 2012/0106423 A1 | 5/2012 | Nylander et al. | |
| 2012/0233478 A1* | 9/2012 | Mucignat | H04W 52/0277 713/320 |
| 2012/0278636 A1 | 11/2012 | Lin et al. | |
| 2015/0026491 A1* | 1/2015 | Park | H04L 12/12 713/310 |
| 2016/0100332 A1* | 4/2016 | Yi | H04W 4/12 370/338 |
| 2016/0187954 A1 | 6/2016 | Garg et al. | |
| 2016/0234783 A1* | 8/2016 | Xing | H04W 76/27 |
| 2016/0337971 A1* | 11/2016 | Bhargava | H04W 28/021 |
| 2017/0170979 A1* | 6/2017 | Khalid | H04W 4/80 |
| 2019/0253971 A1* | 8/2019 | Fontaine | H04L 12/12 |

FOREIGN PATENT DOCUMENTS

| | | |
|---|---|---|
| CN | 102547944 A | 7/2012 |
| CN | 102761941 A | 10/2012 |
| CN | 102804861 A | 11/2012 |
| CN | 105182922 A | 12/2015 |
| WO | WO 2007024306 A1 | 3/2007 |
| WO | 2011066849 A1 | 6/2011 |

\* cited by examiner

METHOD TO AWAKEN A NETWORK ACCESS DEVICE FROM THE INTERNET

FIELD

The proposed method is directed to support remote access to an end user's customer premises equipment via a service provider's network.

BACKGROUND

In multicast and broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Residential gateways are typically connected to an access point (AP) via a local area network (LAN) or wireless LAN (WLAN) such as IEEE 802.11. Normally, a residential gateway is continuously powered on always (24 hours a day 7 days a week). However, residential gateways are not in use during the daytime as people are not in home during the day. Client devices typically access the Internet through a residential gateway. Seldom do client devices access the Internet remotely via a wide area network (WAN) for operator maintenance or remote access to other control devices or client devices in the residence. As used herein, the term residence is used interchangeable with home and environment, where an environment may include, but is not limited to, a home, a small business or any equivalent environment. Thus, maintaining the power on 24 hours a day 7 days per week is wasted during the daytime at least during the workweek. The term client device, as used herein, includes, but is not limited to, dual mode smart phones, tablets, personal digital assistants (PDAs), laptop computers, notebook computers and any other device that a user can move and use remotely (a computing device that is mobile). The term control devices, as used herein, includes, but is not limited to, any device that can be controlled by a client device, such as a programmable thermostat, lights, a security system etc.

Consider a normal power 10 W of a typical residential gateway, and 10 hours daytime of working and travel, every working day the residential gateway would waste about 100 W power. Therefore, there needs to be a mechanism or solution that allows the residential gateway device to work in power save mode when no active access is required.

Methods already exist to save the WiFi AP power, if no client device (station, node) is associated with the residential gateway. And, these methods focus on awakening the AP or residential gateway via the LAN (or WLAN) side. Meanwhile, in the Internet of Things (IoT) home network, there could be many scenarios (situations, conditions) that require the user of a client device to remotely access and control home electronic devices, e.g., air conditioner, windows controller, camera monitor via residential gateway from Internet. A residential gateway is required to be in sleep mode to save power when there is no connection request from either LAN side or WAN/Internet side. In the case where a client device on the LAN side needs to make a connection through a sleeping residential gateway, the above technologies mentioned enable a residential gateway to wake up (awaken) immediately. Correspondingly, if a client device needs or desires (wants, wishes) to access another device on the LAN side but is remote, then the client device must access the device through the WAN (WLAN) side. This is made more difficult is the residential gateway is in sleep mode. In order for the client device to access a device on the LAN side remotely, a means for the client device to awaken the residential gateway from the WAN (WLAN) side is needed.

In conventional technologies, accessing a residential gateway remotely by a client device from WAN/Internet side requires that a fully qualified domain name (FQDN) of the residential gateway has been registered in domain name server (DNS) server.

Via that residential gateway's FQDN, the client device in, e.g., smart phone can then successfully query the gateway's IP address and then establish the connection to the gateway. However, 1. In conventional procedures, if the residential gateway is in sleep mode, the remote client device will not be able to establish that connection.

2. Moreover, it is also not possible for the operator's (service provider's) access router (which acts as the default gateway of the residential gateway) to wake up that residential gateway since its physical location is unknown, i.e., the operator's network does not know via which access router the wake-up frame (message, packet, request, command) should be transmitted.

3. Additionally, the residential gateway is required to register a FQDN in DNS, normally via dynamic DNS technology. For an end user of a client device, this is not so convenient to configure and moreover, there is an additional cost for that service. The service provider (operator) would prefer to provide services more than just an Internet connection. The technology proposed in this proposed method and apparatus would enable service providers (operators) to have a more comprehensive service in the IoT home.

SUMMARY

Gateways, gateway devices, residential gateways and set top boxes are examples of network access devices. Residential gateways, which are an example of network access devices, will be used throughout the specification to describe the proposed method and apparatus but the use of the term "residential gateway" should not be taken as limiting.

To resolve the limitations of the conventional technology, the proposed method and apparatus provides support in the service provider's (operator's) network to wake up the end user's residential gateway if the end user's residential gateway is in sleep mode, while not requiring the end user (using a client device) to register a FQDN for the residential gateway.

In a first embodiment, a method and apparatus are described including transmitting localization information to a localization server, transitioning into sleep mode, receiving a wake up frame from an access router, transitioning to awake mode, transmitting updated localization information to the localization server and establishing a connection between a network access device and a client device.

In another embodiment, the gateway is a residential gateway.

In another embodiment, the transitioning further comprises triggering a signal to a processor to wake up.

In another embodiment, a method and apparatus are described including transmitting a request to connect to a network access device, receiving localization information of the network access device from a localization server and establishing a connection between the network access device and the client device based on the localization information.

In another embodiment, the request includes one of account information and a serial number of the gateway.

In another embodiment, the request is transmitted via a service provider's user interface.

In another embodiment, a method and apparatus are described including receiving localization information from a residential gateway at a localization server, storing the localization information at the localization server, receiving a request to connect remotely to the residential gateway from a client device, determining by the localization server if the localization server has current localization information for the residential gateway, transmitting the current localization information to the client device, if the current localization information is available, transmitting a wake up packet to an access router associated with the residential gateway, if the current localization information is not available at the localization server, receiving the current localization information from the residential gateway, transmitting the received current localization information to the client device and establishing a connection between the residential gateway and the client device.

In another embodiment, the localization information includes gateway specific information including a media access control (MAC) address of a wide area network (WAN) interface, a serial number (SN) of the gateway, an internet protocol (IP) address of an access router in a service provider's network and an IP address of the gateway/WAN interface.

In another embodiment, the localization server is in the service provider's network.

In another embodiment, the localization server stores a user's account information with the localization information in memory, if a service provider assigned an account to the user.

In another embodiment, the IP address of said gateway is reset after a time period.

BRIEF DESCRIPTION OF THE DRAWINGS

The proposed method and apparatus is best understood from the following detailed description when read in conjunction with the accompanying drawings. The drawings include the following figures briefly described below.

It should be understood that the drawing(s) are for purposes of illustrating the concepts of the disclosure and is not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 1:
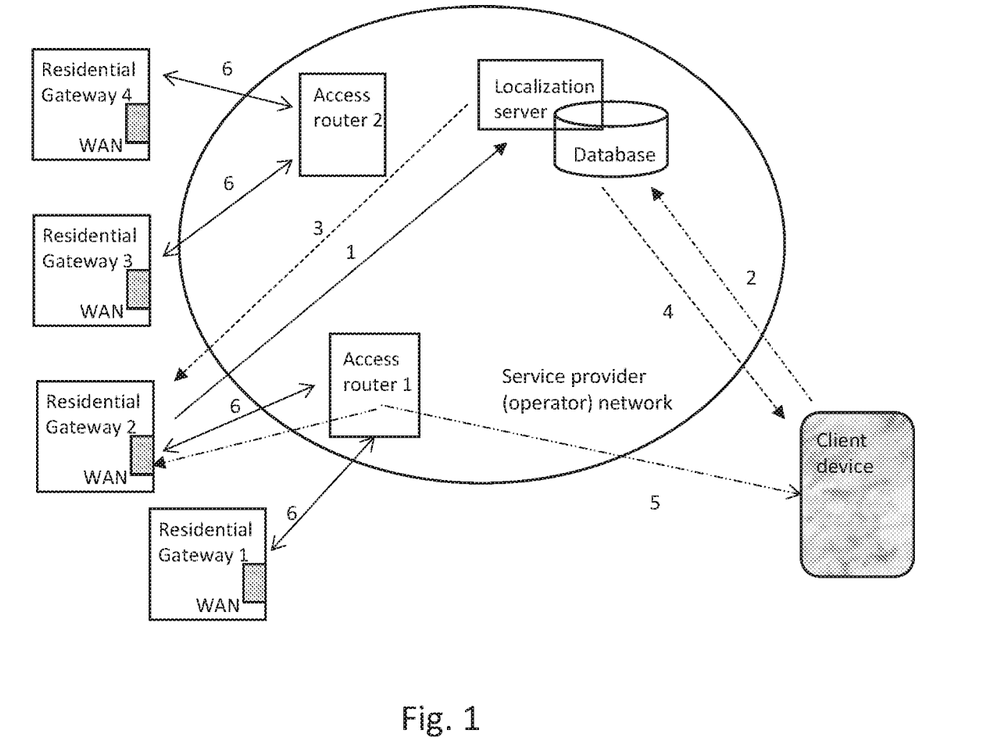
FIG. 1 is a schematic diagram of the remote wake-up scenario of the proposed method and apparatus.

FIG. 1 is a schematic diagram of the remote wake-up scenario of the proposed method and apparatus. While a (residential) gateway is awake and has an active connection to the default gateway in the service provider's (operator's) network, periodically the residential gateway sends (transmits) a localization packet (frame, message) flow (1) on FIG. 1 to a customer premises equipment (CPE) localization server in the service provider's (operator's) network. The localization packet, should include the following data:

1) Residential gateway device specific information including, e.g., MAC address of the WAN/Internet data interface, serial number (SN) of the residential gateway. The device specific information refers to information that is hardcoded in the residential gateway and remains unchanged even if the residential gateway is powered off. It is also possible to include other types of device specific information, which depend on specific residential gateway device and its vendor (manufacturer).
2) IP address of the default gateway, i.e. the access router in service provider's (operator's) network. The default gateway normally is configured via, e.g., Dynamic Host Configuration Protocol (DHCP) or point-to-point protocol (PPP). DHCP is one of the protocols in the TCP/IP networking suite.
3) IP address of the residential gateway/WAN interface connected to Internet.

Correspondingly, the operator's CPE localization server will save the data contained in the localization packet (frame, message) transmitted (sent, forwarded) from each of its residential gateways, typically into a local database in the service provider's (operator's) server. Moreover, if the service provider (operator) assigned the user an account for his/her residential gateway to access internet, the account information is also stored together within that record of localization information of that user and the user's residential gateway information. This account information can be easily queried locally by the service provider (operator) with the device specific information, e.g., SN or MAC address. Or, the account information can be included in the localization packet (frame, message) sent (transmitted) by the residential gateway directly.

The residential gateway's IP address information in the record can be reset to empty if, after a predetermined time period (interval) the service provider's (operator's) server did not receive a new localization packet containing the IP address from the residential gateway. This is typically due to the residential gateway being in (being put into) sleep mode or powered off.

When the end user using a client device wants to access his/her residential gateway in their home remotely from Internet, the user (through his/her client device) transmits (send) his/her account information or SN information via the service provider's (operator's) user interface (UI), e.g., app or web browser, through a query flow (2) on FIG. 1. With this account information or SN, by searching in the localization server, service provider (operator) server can then locate (find) the residential gateway's relevant information, e.g., MAC, IP and access router IP, which connects the end user (through his/her client device) to the end user's residential gateway.

If there is an IP address in the residential gateway's record, then that means that the residential gateway was still active a moment ago when its most recent localization packet was received. The localization server can then return the residential gateway's IP address to the end user's client device. If the residential gateway is still active, the connection can immediately be established with the client device remotely upon request.

However, it may be the fact that, there is no IP address in the residential gateway record or the IP address has expired (is stale) since the localization packet (frame, message) was last sent (transmitted) by the residential gateway. In the latter case, the end user's client device can report an error notifying the service provider's (operator's) server. Then, in this scenario, the service provider (operator) would assume the user's residential gateway is in sleep mode and try to awaken it.

Assuming that the residential gateway is in sleep mode, the service provider's (operator's) network will then trigger a wake-up frame (packet, message, request, command) to be sent (transmitted, forwarded) flow (3) on FIG. 1 to the residential gateway. Details as follows:

1) First, the service provider's (operator's) network should determine the IP address of the access router to which the residential gateway is physically connected. This can be done by searching in the localization server with the residential gateway's SN or user account information.
2) With that access router's IP address, the service provider's (operator's) network triggers transmission of a subnet directed broadcast (SDB) with a wake-up packet (frame, message, request, command). The SDB is a standard technology. A SDB packet is treated as a normal network packet until processed by the final access router in the connection path to reach the end user's residence. When the final access router receives the SDB containing the wake-up packet (frame, message, request, command), the final access router converts the packet into a broadcast packet. Since the end user's residential gateway is bridged to the final access router, i.e., no intermediate router between the residential gateway and final access router, the broadcast packet can then be received by the residential gateway successfully as long as the residential gateway is in sleep mode, i.e., the link layer is active.
3) Since there could be various link types in the access network between the residential gateway and access router, e.g., Ethernet, passive optical network (PON), digital subscriber line (DSL), how to transmit (send, forward, broadcast) the wake-up frame (packet, message, request, command) over the links connected to the access router depends on further link layer technologies. For example on Ethernet, the wake-up packet (frame, message, request, command) is converted into a wake-on-LAN magic packet (frame) and is sent out (transmitted) through each Ethernet bridged port.

On the residential gateway which is in sleep mode, after the link terminating chipset (or sub-module in a highly integrated chipset) received this wake-up frame, the residential gateway recognizes that this frame is destined for itself since the destination MAC address is its own MAC address. Then, the link terminating chipset or sub-module will trigger a signal to the main CPU of the residential gateway to wake up. Consequently, the IP connection to the access router will be established and a localization packet will be immediately sent (transmitted, forwarded) to localization flow (4) on FIG. 1 server. The residential gateway's IP address is then forwarded (transmitted, sent) to the end user's client device and hence the remote access connection can be successfully established flow (5) on FIG. 1 via the Internet. Flows (6) on FIG. 1 indicate bridged connections between a residential gateway and the access router associated with the residential gateway (access router through which the residential gateway accesses the service provider's (operator's) network and the Internet).

Figure 2:
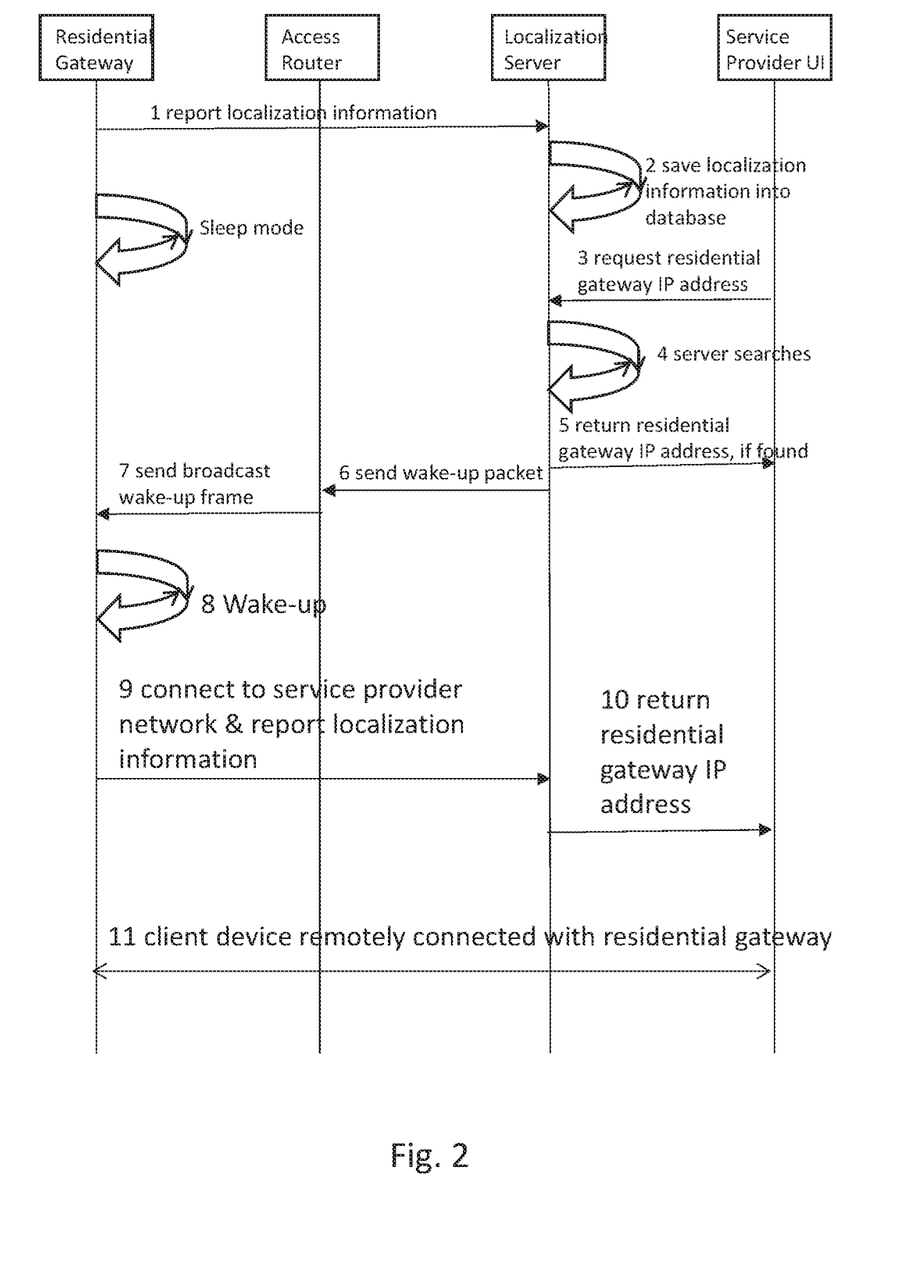
FIG. 2 is a ladder diagram of the remote wake-up scenario of the proposed method and apparatus.

FIG. 2 is a ladder diagram of the remote wake-up scenario of the proposed method and apparatus. As illustrated in FIG. 2:

1. The residential gateway reports its localization information to the service provider's (operator's) localization server, including the information as described above.
2. The localization server saves (stores, records) the information into a database.
3. The end user triggers access to his/her residential gateway via the operator's UI, with e.g. SN or account/password. Note, before this step, the residential gateway may go into (enter) sleep mode.
4. The localization server searches for the residential gateway IP address, or its corresponding access router IP address if the residential gateway IP address is empty (stale).
5. The localization server returns the residential gateway IP address if the residential gateway address is found.
6. If the residential gateway IP address is empty (stale), the localization server triggers transmission of a wake-up packet (such as a subnet directed broadcast) to the access router associated with the residential gateway.
7. The access router converts the wake-up packet into a broadcast wake-up frame sent to all its residential gateways connected in link layer, e.g., a residential gateway using an Ethernet connection.
8. The residential gateway should wake-up after recognizing the wake-up frame destined for itself.
9. The residential gateway connects to the service provider (operator) network and then transmits a localization packet including localization information to the localization server immediately after wake-up.
10. The localization server returns the residential gateway IP address to end user client device.
11. The end user client device can then successfully connect remotely to his/her residential gateway.

Figure 3:
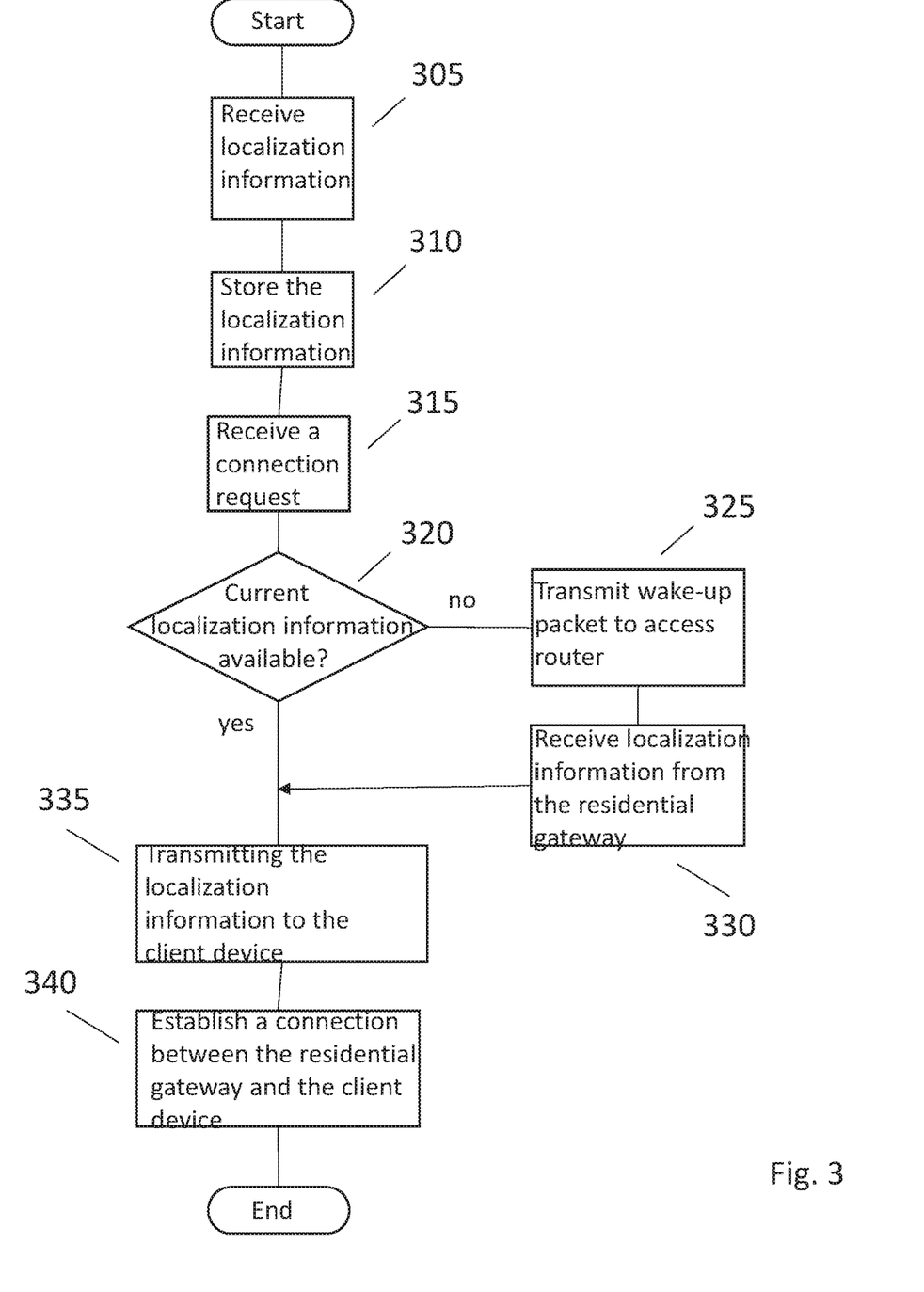
FIG. 3 is a flowchart of the operation of the proposed method for the localization server.

FIG. 3 is a flowchart of the operation of the proposed method for the localization server. At 305 the localization server receives localization information from a residential gateway. The localization server stores the localization information in a database at the localization server. At 315 the localization server receives a request to remotely connect to the residential gateway from a client device. At 320 a determination is made if the localization server has (current) localization information for the residential gateway. If the (current) localization information is not available at the localization server, then at 325 the localization server transmits a wake up packet to an access router associated with the residential gateway. The wake-up packet is a subnet directed broadcast wake-up packet. At 330 the localization server receives updated localization information from the residential gateway. If the localization server has current localization information for the residential gateway, then at 335 the localization server transmits the current localization information to the client device. If the localization server did not have the (current) localization information but subsequently received updated localization information (330) then at 335 the localization server transmits the updated localization information to the client device. At 340 a connection is established between the residential gateway and the client device through an access router.

Figure 4:
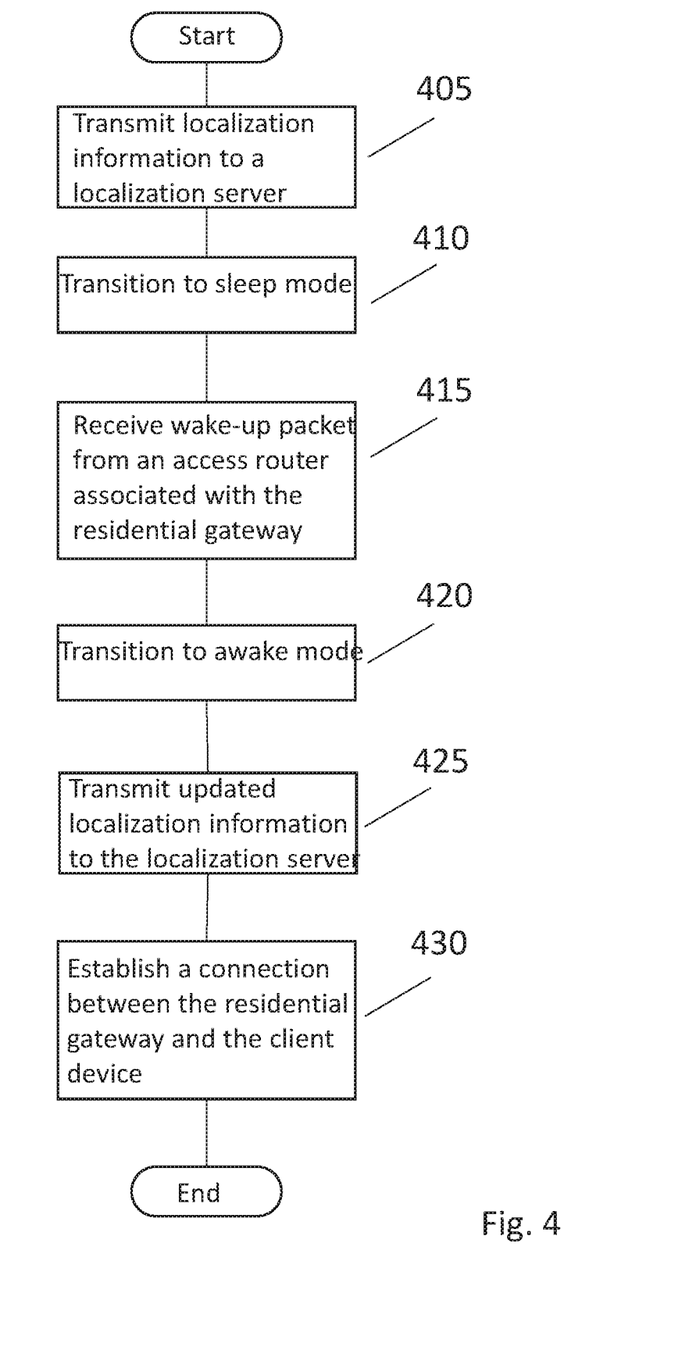
FIG. 4 is a flowchart of the operation of the proposed method for the residential gateway.

FIG. 4 is a flowchart of the operation of the proposed method for the residential gateway. At 405 the residential gateway transmits localization information to a localization server. At 410 the residential gateway transitions into sleep mode. At 415 the residential gateway receives a wake up frame (message, packet) from an access router associated with the residential gateway. At 420 the residential gateway transitions to awake mode. At 425 the residential gateway transmits updated localization information to the localization server. At 430 a connection is established between the residential gateway and the client device.

Figure 5:
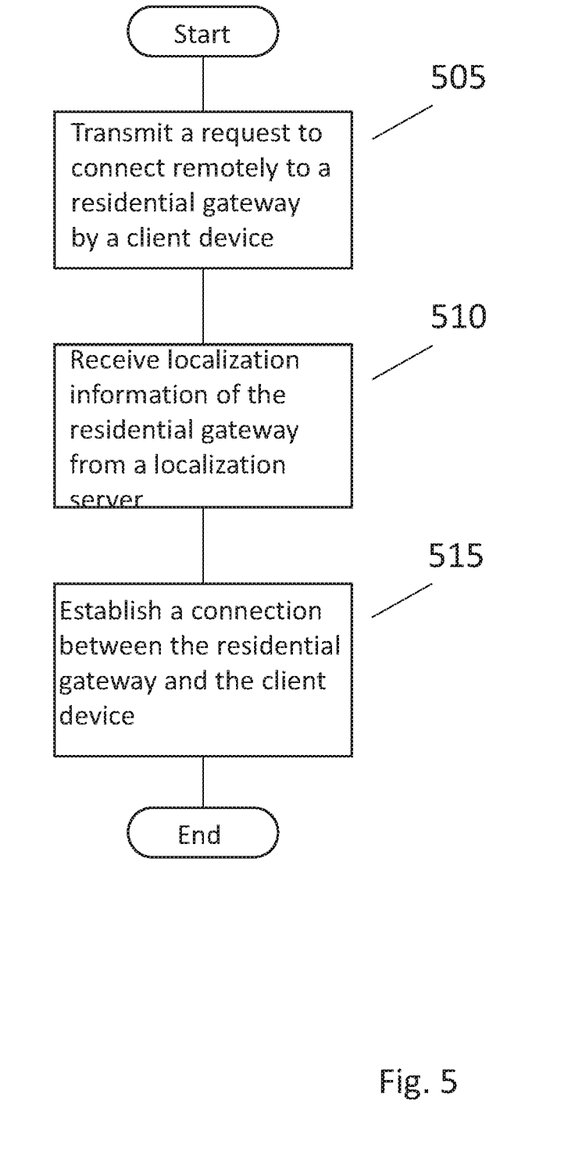
FIG. 5 is a flowchart of the operation of the proposed method for the client device.

FIG. 5 is a flowchart of the operation of the proposed method for the client device. At 505 the client device transmits a request to connect to a residential gateway. At 510 the client device receives localization information of the residential gateway from a localization server. At 515 a connection is established between the residential gateway and the client device based on said localization information.

Figure 6:
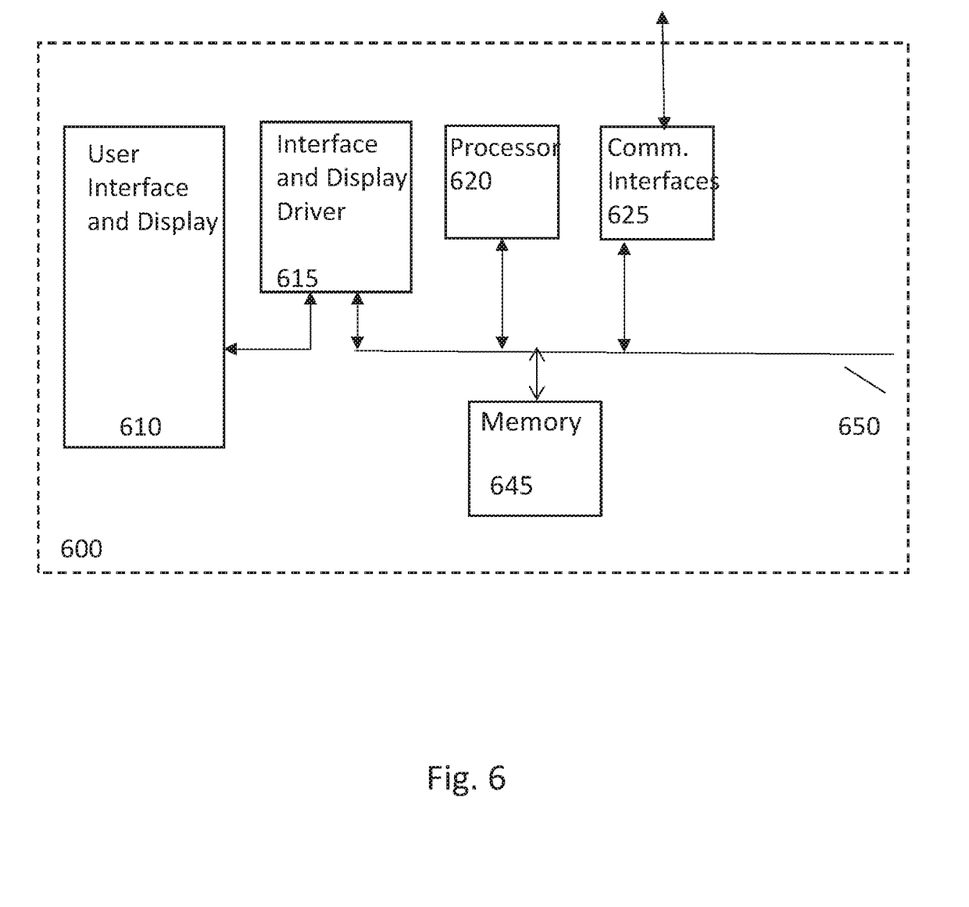
FIG. 6 is a block diagram of an exemplary device such as a residential gateway or client device.

FIG. 6 is a block diagram of an exemplary device such as a residential gateway or client device 600. The block diagram configuration includes a bus-oriented 650 configuration interconnecting a processor (processing unit) 620, and a memory 645. The configuration of FIG. 6 also includes a communication interface 625. The communication interface 625 may be wired or wireless and may in fact, include two interfaces—one for wired line communication and one for wireless communication. User interface and display 610 is driven by interface circuit 615.

Processor 620 provides computation functions for the device, such as depicted in FIGS. 1-2 and 4-5. The processor 620 can be any form of CPU or controller that utilizes communications between elements of the device to control communication and computation processes. Those of skill in the art recognize that bus 650 provides a communication path between the various elements of embodiment 600 and that other point-to-point interconnection options (e.g. non-bus architecture) are also feasible.

Any or all of the functionality included in the device may be embodied as application specific integrated circuits (ASICs), field programmable gate arrays (FPGAs), reduced instruction set computers (RISCs) or any other equivalent separate type of co-processor integrated into processor 620.

Memory 645 can act as a repository for memory related to any of the methods that incorporate the functionality of the device. Memory 645 can provide the repository for storage of information such as program memory, downloads, uploads, or scratchpad calculations. Those of skill in the art will recognize that memory 645 may be incorporated all or in part of processor 620. Communication interface 625 has both receiver and transmitter elements for communication as known to those of skill in the art. Program instructions for operation of the processor of the device may be in memory 645 or may be in processor.

A communication interface 625 of a gateway 600 transmits localization information to a localization server. A processor 620 of the gateway 600 transitions the gateway into sleep mode. The communications interface 625 of the gateway 600 receives a wake up frame from an access router associated with the gateway 600. The processor 620 of the gateway 600 transitions the gateway 600 to awake mode. The communications interface 625 of the gateway 600 transmits updated localization information to the localization server. The processor 620 of the gateway 600 establishes a connection between the gateway 600 and the client device.

A communications interface 625 of a client device 600 transmits a request to connect to a gateway by a client device 600. The communications interface 625 of the client device 600 receives localization information of the gateway from a localization server. A processor 620 of the client device 600 establishes a connection between the gateway and the client device 600 based on the localization information.

The localization server has a similar configuration as shown in FIG. 6 but based on the necessity to serve multiple users via multiple access routers and multiple residential gateways, may include a plurality of processors, significantly more or larger memory and multiple communication interfaces. One or more of the processors provide computation functions for the localization server such as depicted in FIG. 3. The processors can be any form of CPU or controller that utilizes communications between elements of the device to control communication and computation processes. Those of skill in the art recognize that bus (or busses) of the localization server provide a communication path between the various elements of localization server and that other point-to-point interconnection options (e.g. non-bus architecture) are also feasible.

In a localization server, localization information is received from a gateway via one or more communication interfaces. The localization information is stored in memory. If a service provider assigned an account to a user then the user's account information is also stored in memory. The localization server receives a request to connect remotely to the gateway from a client device via one or more communication interfaces. One or more processors of the localization server determine if the localization server has updated localization information for the gateway. If the updated localization information is available then the localization server transmits the updated localization information to the client device via one or more communication interfaces. If the updated localization information is not available at the localization server then the localization server transmits a wake up packet to an access router associated with the residential gateway. The localization server receives the updated localization information from the gateway via one or more communication interfaces. The localization server transmits the received updated localization information to the client device via one or more communication interfaces. One or more processors of the localization server establishes a connection between the gateway and the client device via one or more communication interfaces.

Any or all of the functionality included in the device may be embodied as application specific integrated circuits (ASICs), field programmable gate arrays (FPGAs), reduced instruction set computers (RISCs) or any other equivalent separate type of co-processor integrated into the processors.

Memory (or memory elements or databases) can act as a repository for memory related to any of the methods that incorporate the functionality of the localization server. Memory (or memory elements or databases) can provide the repository for storage of information such as program memory, downloads, uploads, or scratchpad calculations. Those of skill in the art will recognize that memory (or memory elements or databases) may be incorporated all or in part of the processors. The communication interfaces have both receiver and transmitter elements for communication as known to those of skill in the art. Program instructions for operation of the processor of the localization server may be in memory (or memory elements or databases) or may be in the processors.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the proposed method and apparatus is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method steps depicted in the accompanying figures are preferably implemented in software, the actual connections between the system components (or the process steps) may differ depending upon the manner in which the proposed method and apparatus is programmed. Given the teachings herein, one of ordinary skill in the related art will be able to contemplate these and similar implementations or configurations of the proposed method and apparatus.

For purposes of this application and the claims, using the exemplary phrase "at least one of A, B and C," the phrase means "only A, or only B, or only C, or any combination of A, B and C."

The invention claimed is:

1. A method configured to be implemented at a network access device comprising:
    transmitting network access device localization information to a localization server;
    transitioning into sleep mode;
    receiving a wake-up frame from an access router;
    transitioning to awake mode upon receipt of the wake-up frame; and
    transmitting updated localization information to said localization server for establishing a connection between the network access device and a client device;
    wherein the updated localization information is stored with a user's account information at the localization server;
    wherein the updated localization information comprises information specific to said network access device, including at least one of a media access control (MAC) address of a wide area network (WAN) interface, serial number (SN) of the network access device, and an IP address of the network access device; and
    wherein the updated localization information further comprises an IP address of said access router.

2. The method according to claim 1, wherein said network access device is implemented by a gateway or a set top box.

3. A network access device, comprising:
- a transmitter configured to:
  - transmit network access device localization information to a localization server; and
  - transmit updated localization information to said localization server for establishing a connection between said network access device and a client device;
- a receiver configured to receive a wake-up frame from an access router; and
- a processor configured to:
  - transition the network access device into sleep mode; and
  - transition the network access device to awake mode upon receipt of the wake-up frame;
- wherein the updated localization information is stored with a user's account information at the localization server;
- wherein the updated localization information comprises information specific to said network access device, including at least one of one of a media access control (MAC) address of a wide area network (WAN) interface, serial number (SN) of the network access device, and an IP address of the network access device;
- wherein the updated localization information further compromises an IP address of said access router.

4. The network access device according to claim 3, wherein said network access device is a gateway or a set top box.

* * * * *